United States Patent [19]

Williams

[11] 4,323,133
[45] Apr. 6, 1982

[54] FOLDING FRAMEWORKS AND WHEEL-CHAIRS

[76] Inventor: Patrick Y. Williams, Golden Eagles Flats, 6 Fawcett St., Ballina, New South Wales, Australia, 2478

[21] Appl. No.: 125,881

[22] Filed: Feb. 29, 1980

[30] Foreign Application Priority Data

Mar. 5, 1979 [AU] Australia .............................. PD7895
Apr. 5, 1979 [AU] Australia .............................. PD8294

[51] Int. Cl.³ .......................... B60K 1/02; B62B 7/06; A61G 5/02
[52] U.S. Cl. ........................... 180/65 R; 180/DIG. 3; 248/436; 280/42; 280/242 WC; 297/42; 297/DIG. 4
[58] Field of Search ........................ 280/242 WC, 42; 180/DIG. 3, 208, 65 R; 297/DIG. 4, 42, 44, 45; 248/436

[56] References Cited

U.S. PATENT DOCUMENTS

| | | | |
|---|---|---|---|
| 2,180,642 | 11/1939 | Mochan | 280/42 |
| 2,592,405 | 4/1952 | Everest | 297/42 |
| 2,782,870 | 2/1957 | Sill | 297/DIG. 4 |
| 3,142,351 | 7/1964 | Green | 297/DIG. 4 |
| 3,758,150 | 9/1973 | Williams | 297/DIG. 4 |
| 3,931,985 | 1/1976 | Knebel | 280/42 |

FOREIGN PATENT DOCUMENTS 711448 6/1954 United Kingdom ................. 280/42

Primary Examiner—John P. Silverstrim

[57] ABSTRACT

A folding framework for a wheelchair has side frames interconnected by front and rear toggle braces each preferably formed from a pair of U-shaped arms of spring wire and a linkage extends between the hinges of the toggle braces. A securing arm is latchable with the linkage to hold the structure in an erected condition, the arrangement being such that the side frames are maintained parallel to one another. Direct drive motors may be mounted on wheels and to facilitate folding the hinges of the toggle brace may be offset relative to the fore and aft line of the vehicle so that when folded the side frames are offset relative to one another and the motors overlap. Preferably a diagonal brace extends below the folding framework to maintain parallel alignment of the side frames and a latching arm co-operates with the linkage between the toggle braces so that on lifting the latching arm, the linkage and the toggle braces are displaced in the closing direction.

10 Claims, 5 Drawing Figures

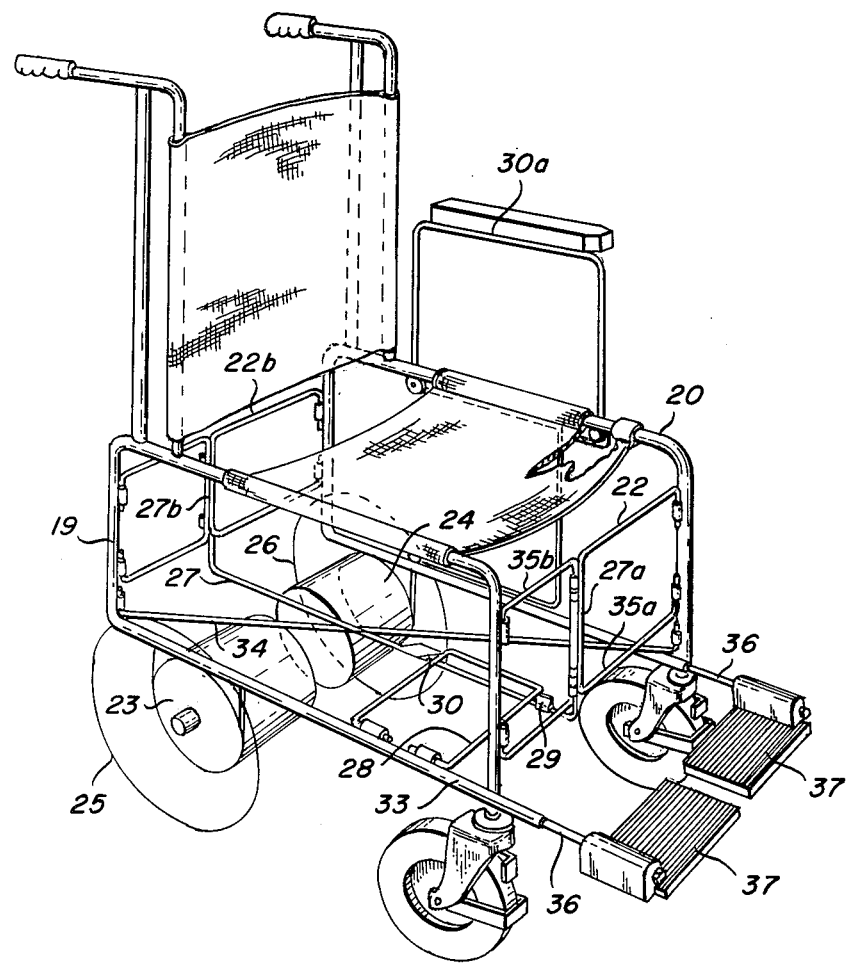

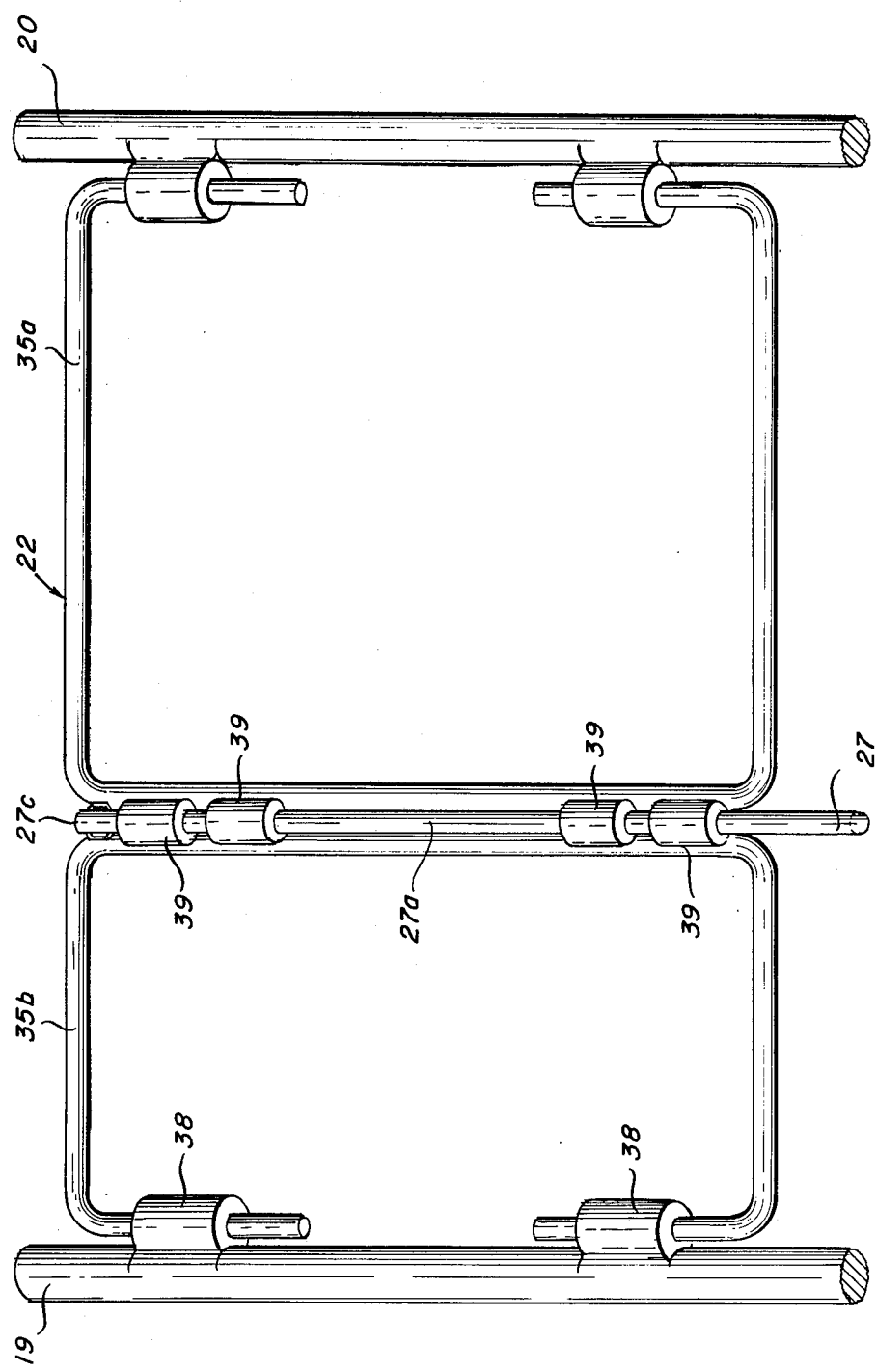

FOLDING FRAMEWORKS AND WHEEL-CHAIRS

FIELD OF THE INVENTION

The present invention relates to folding frameworks for vehicles such as wheelchairs including motorized wheelchairs. Although the invention is particularly applicable to wheelchairs, the folding frameworks of the invention may be applied advantageously to analagous structures.

BACKGROUND TO THE INVENTION

The present specification concerns developments and improvements based on the present applicant's prior U.S. Pat. No. 3,758,150 and pending application Ser. No. 17704 filed Mar. 5, 1979 and which corresponds to Australian Patent Application No. 41119/79 laid open to public inspection in Australia Sept. 15, 1979. The wheelchair of U.S. Pat. No. 3,758,150 represented a significant development in the art in permitting a relatively lightweight and durable wheelchair to be provided yet with improved compactness when folded. The side frames of the wheelchair when adapted to be spaced apart by toggle braces in the bottom, rear and top regions. However, it was subsequently realized by the inventor that further improvements could be made particularly with a view to providing the user such as the handicapped person with a more convenient, safe and easily folded wheelchair. The disclosure of copending application No. 17704 relates to improvements which are considered to provide an effective solution to the problems of compactness, lightweight, durability and ease of operation by a handicapped person. In particular folding of a bottom toggle brace initiated a folding action. However, it was considered desirable to seek yet further improvements and developments with a view to reducing manufacturing costs, maintaining lightness and durability and providing a structure which could be used in a motorized wheelchair.

OBJECTS OF THE INVENTION

A primary object of the invention is to provide a structure which may be used in a wheelchair and to provide an arrangment which can be readily folded and unfolded and yet is compact when folded, durable when in use and relatively light in weight. Furthermore it is desirable to provide a structure which can be readily and inexpensively manufactured, minimizing use of skilled labor and specialist equipment.

SUMMARY OF THE INVENTION

With particular advantage the present invention may be applied to a vehicle having a folding structure capable of use in a wheelchair or similar vehicle, the folding structure comprising first and second side frames for mounting wheels, first and second toggle braces respectively mounted between the side frames at the front and rear of the vehicle and for folding substantially about vertical axes, a linking arm linking the first and second toggle braces substantially from the region of their hinges and bracing means operative to hold the structure in an extended condition and displaceable to a retracted position thereby permitting the first and second toggle braces to fold from their extended positions and permit the side frames to move adjacent one another in a folded position. In order to cause overlapping of internal protuberances such as electric motors or bolt heads when the structure is folded, the central hinges of the toggle braces are off-set from the fore/aft central plane of the structure.

However, the present invention is more broadly applicable and more generally is found in a folding structure capable of use in a wheelchair or other structure, the folding structure comprising first and second side frames, the side frames being connected by first and second toggle braces at opposite ends of the side frames, the toggle braces having their respective central hinges with hinge axes parallel to and similarly offset from a central plane of the structure when the structure is in an erected postion, whereby the structure may be folded to bring the side frames to positions adjacent to one another but offset in a direction parallel to said central plane, and bracing means for holding said structure in said erected position and maintaining the side frames substantially parallel to one another when the structure is being folded.

Preferably the bracing means includes a latching arm pivotally mounted on a lower member of a side frame and engageable with latch means on the linking arm, and a diagonal bracing member is provided, the bracing member being pivotally connected at its respective ends adjacent opposite corners of the structure.

According to another inventive aspect, there is provided a folding structure for use in a wheelchair or other vehicle having wheels, the folding structure comprising first and second side frames which are connected by toggle braces arranged such that in a folded position the side frames lie adjacent one another and in an extended position the toggle braces act to brace apart the side frames, the toggle braces each comprising first and second U-shaped arms hingeably interconnected, and each of the arms being formed by spring wire whereby, when the structure is in use, flexing of the structure occurs in the toggle braces for absorbing strains.

With great advantage the invention may be applied to a motorized wheelchair embodying all the above inventive aspects, motors being mounted directly onto wheels of the wheelchair, the offsetting of the hinges of the toggle braces causing the side frames to be offset in the fore and aft direction when the wheelchair is folded thereby permitting the motors to overlap in the folded condition. The use of a latching arm and a diagonal bracing member permits easy and controlled folding and unfolding of the wheelchair by virtue of the side frames being maintained substantially parallel to one another. Use of spring wire in the toggle braces provides a very inexpensive mode of manufacture which nevertheless can provide a high strength weight ratio and readily permit the absorption of strains set up when the wheelchair runs over uneven ground. Furthermore manufacture and assembly can be greatly facilitated and a very compact relatively lightweight structure can be produced.

The application of electric motors as a direct drive to rear wheels of the wheelchair is considered to be very important in order to minimize power losses which would otherwise occur through the use of drive chains, gear boxes or the like. The adoption of direct drive means that the motors are ordinarily substantially axially aligned when the wheelchair is erected and the provision of an offset on folding is therefore very important in order to provide the best possible form of motorized wheelchair which can be folded to a compact form.

Motorized wheelchairs hitherto on the market have been relatively clumsy, very expensive and very heavy and thus a person so severely handicapped as to require a motorized wheelchair may have much greater problems in handling a wheelchair, for example when folding the wheelchair and putting it into a vehicle.

BRIEF DESCRIPTION OF THE DRAWINGS

A preferred embodiment of the invention in the form of a motorized wheelchair will now be described by way of example with reference to the accompanying drawings of which:

FIG. 3 is a more substantive view of the wheelchair of FIG. 1 and including a brace arm omitted from FIGS. 1, 2A and 2B for the purposes of clarity; and FIG. 4 illustrates on an enlarged scale a detail view from the front and below illustrating the front toggle brace.

DETAILED DESCRIPTION OF THE DRAWINGS

Figure 1:
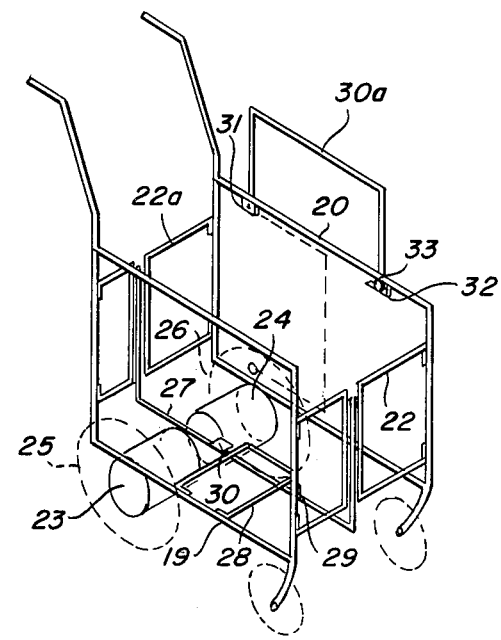
FIG. 1 shows a schematic drawing of a wheelchair structure embodying the invention.

Referring first to FIG. 1, there is shown a motorized wheelchair comprising rigid side frames 19 and 20 connected at both the front and the rear by toggle braces 22 and 22a respectively. A linking arm 27 links the toggle braces from their respective hinges, the hinges being both offset from the fore/aft center line of the wheelchair by the same amount as better shown in FIG. 2A. Furthermore a U-shaped latching arm 28 is pivotally mounted on the bottom rail of the side frame 19 and in the erected condition engages the linking bar 27 between an abutment stop 29 and a cam-like striker plate 30.

Figure 2A:
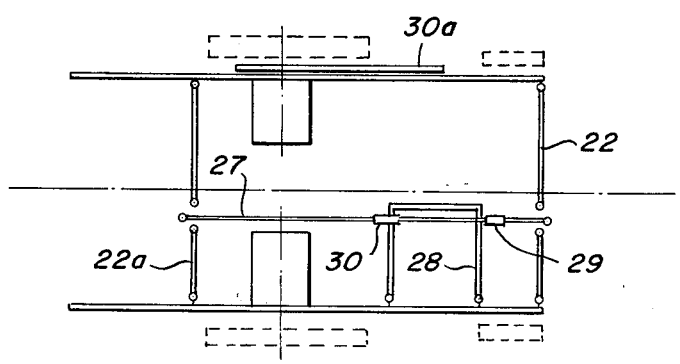
FIG. 2A shows a plan view of the wheelchair structure of FIG. 1.
Figure 2B:
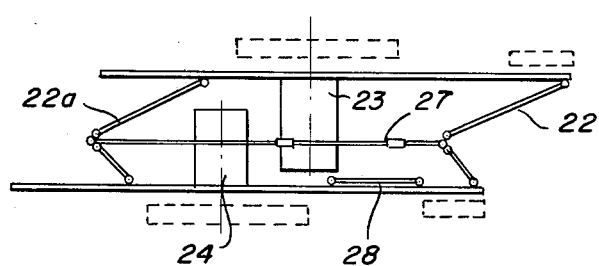
FIG. 2B shows a plan view of the wheelchair structure of FIG. 1 wherein the structure is in a partly folded position.

For the purpose of maintaining the side frames substantially parallel to one another the structure requires a diagonal brace extending under the framework and pivotally connected to opposite corners of the structure, such a brace being illustrated in FIG. 3 but omitted from FIGS. 1, 2A and 2B for purposes of greater clarity.

The purpose of the abutment stop 29 is to prevent the toggle braces being folded rearwardly for example due to accidental impact on the front toggle brace until the latching arm 28 is lifted. The purpose of the cam-like striker plate 30 is to initiate folding of the front and rear toggle braces when the arm 28 is lifted, a remotely operable pull cord being provided if desired to facilitate lifting of the arm 28.

The frame structure also includes folding arm rests of which, for the purposes of clarity, only the left arm rest 30a is illustrated. The arm rest is conveniently formed from spring wire as are the arms of the U-shaped toggle braces 21 and 21a. The rear leg of the arm rest is pivotally connected to a bracket 31 attached to the side frame below the top of the upper rail and the bottom of the forward leg is engaged between the top rail of the side frame and a rearwardly directed horizontal leg of an L-shaped bracket 32, the end of the front leg of the arm rest carrying a grooved block 33 and the inherent spring biasing of the wire maintaining the engagement as illustrated. To fold the arm rest to the position shown in dotted lines, the front leg of the arm rest is flexed rearwardly against its spring biasing to disengage the grooved block 33 thereby permitting the arm rest to be swung downwardly.

Electric motors 23 and 24 are located on the frame with their longitudinal axes transverse to the direction of travel of the wheelchair, and are connected to drive wheels 25 and 26 respectively.

Referring now to FIGS. 2A and 2B, the effect of the offsetting of the hinges of the toggle braces can be seen. As folding takes place the motors move into overlapping relationship, the structure being such that the motors in part project laterally beyond the opposite side frame when fully folded.

Referring now to FIG. 3, it will be seen that the wheelchair has the features of the schematically illustrated wheelchair of FIG. 1 and in addition has a diagonal bracing rod 34 extending beneath the linking bar 27 and having upturned ends pivotally engaged with the front upright tube of the left side frame 20 and the rear upright tube of the right side frame 19.

FIG. 3 also illustrates one form of foot rest that may be used, the foot rest comprising a foot plate 37 pivotally mounted on a mounting rod 36 which is a sliding telescopic fit within the bottom rail of the associated side frame.

Referring now to FIG. 4 a detailed view is given illustrating the hinge arrangement for the front toggle brace, the rear toggle brace being similar. The front toggle brace 21 is formed from large and small generally U-shaped arms 35a and 35b of spring steel, the tips of the arms being turned inwardly towards one another so as to be snap-fitted into respective mounting lugs 38 on the side frame.

The base of each U-shaped arm has respective mounting lugs 39 spaced as shown in the drawing and having a bore therethrough for accomodating an upstanding end 27a of the linking bar 27. The tip 27c of the linking bar is suitably secured so that it cannot drop down through the lugs 39.

The configuration is such that the toggle braces are substantially in a dead center or even in a slightly over-center position in the extended position shown in FIG. 3, the disposition of the bases of the U-shaped arm and the end 27a of the rod 27 preventing the braces going further over center.

I claim:

1. In a motorized folding wheelchair comprising side frames mounting respective front and rear wheels, the rear wheels each having an electric motor connected thereto, the structure being adapted to carry an electric battery to drive the motors and control equipment for controlling the motors, front and rear toggle braces each comprising two hingeably connected arms extending between the front and rear ends of the side frames, a linking element interconnecting the front and rear toggle braces at the region of central hinges thereof, the improvement comprising the hinges being similarly offset relative to the fore/aft central plane of the vehicle, a latching arm hingeably mounted to one of the side frames about an axis substantially parallel to the linking element, the linking element carrying latch means engageable with the arm when it is in a downwardly displaced locking position to hold the toggle braces in an extended and locked position in normal use, and a diagonal bracing element pivotally connected adjacent opposite corners of the structure and extending below the linking element and latching arm, whereby folding of the wheelchair is initiated by upward displacement of said latching arm which engages with the latch means of the linking element to displace the linking element rearwardly thereby causing said toggle braces to commence folding.

2. A wheelchair according to claim 1, wherein said electric motors are directly coupled to respective rear wheels and said offset of the hinges causing the motors to overlap in a folded position.

3. A folding structure capable for use in a wheelchair or other vehicle, comprising
 (a) first and second generally vertical parallel side frame members;
 (b) first and second toggle braces connected between the opposite ends of said side frame members, respectively, each of said toggle braces including a hinge member having a generally vertical axis, said toggle braces being operable between an erect position wherein said first and second side frame members are spaced from one another and said hinges are offset on the same side of a vertical plane extending through the center of the structure, and a folded position wherein said first and second side frame members are adjacent one another and offset in a direction parallel to the central vertical plane;
 (c) a bracing member connected at its opposite ends with diagonally opposed portions of said side frame members, respectively, for maintaining said side frame members in parallel during operation of said toggle braces between their erect and folded positions, respectively; and
 (d) fastening means for holding said toggle braces in their erect positions, respectivley, said fastening means including
  (1) a linking arm member connected at its opposite ends with said hinges, respectively;
  (2) a latching arm member pivotally connected with one of said side frames; and
  (3) latch means for connecting said latching arm member with said linking arm member when said toggle braces are in their erect positions, respectively, thereby to prevent displacement of said linking arm member relative to said side frame members, whereby said toggle braces are held in their erect positions, respectively.

4. A folding structure as defined in claim 3, wherein said toggle braces fold in a rearward direction, and further wherein said latch means comprise an abutment elment on a forward portion of said linking arm member and positioned to abut said latching arm member when said toggle braces are in their erect positions, respectively, thereby preventing folding movement of said toggle braces.

5. A folding structure as defined in claim 4, wherein said latch means further comprises a striker element mounted on said linking arm member and positioned immediately rearward of said latching arm member when said toggle braces are in their erect positions, respectively, and adapted for displacement when said latching arm member is pivotally displaced upwardly, thereby initiating operation of said hinge members to the folded position.

6. A folding structure as defined in claim 3, wherein said linking arm member has a rod-like configuration, the opposite ends of which are turned upwardly and comprises pins for said toggle brace hinge members, respectively.

7. A folding structure capable for use in a wheelchair or other vehicle, comprising
 (a) first and second generally vertical parallel side frame members;
 (b) first and second toggle braces connected between the opposite ends of said side frame members, respectively each of said toggle braces including a hinge member having a generally vertical axis, said toggle braces being operable between an erect position wherein said first and second side frame members are spaced from one another and said hinges are offset on the same side of a vertical plane extending through the center of the structure, and a folded position wherein said first and second side frame members are adjacent one another and offset in a direction parallel to the central vertical plane; and
 (c) a bracing member connected at its opposite ends with diagonally opposed portions of said side frame members, respectively, for maintaining said side frame members in parallel during operation of said toggle braces between their erect and folded positions, respectively.

8. A folding structure as defined in claim 7, wherein said toggle braces have a generally U-shaped configuration and are formed of spring wire, whereby said toggle braces flex when strains are imposed on the structure during its use.

9. A folding structure as defined in claim 7, and further comprising a pair of wheels connected with each of said side frame members, respectively.

10. A folding structure as defined in claim 9, wherein each of side frame members includes a mounting bracket, and further comprising a pair of folding armrests connected with said side frame members, respectively, said arm rests having a generally U-shaped configuration and being formed of spring wire, each of said arm rests including
 (1) a rear leg portion pivotally connected at its free end with said side frame member; and
 (2) a front leg portion connected in wedging relation with said mounting bracket, whereby said said armrest front leg portion is disconnected from said mounting bracket by flexing said armrest, said armrest is pivoted downwardly to a position generally within the perimeter of said side frame member.

* * * * *